Figure 10:
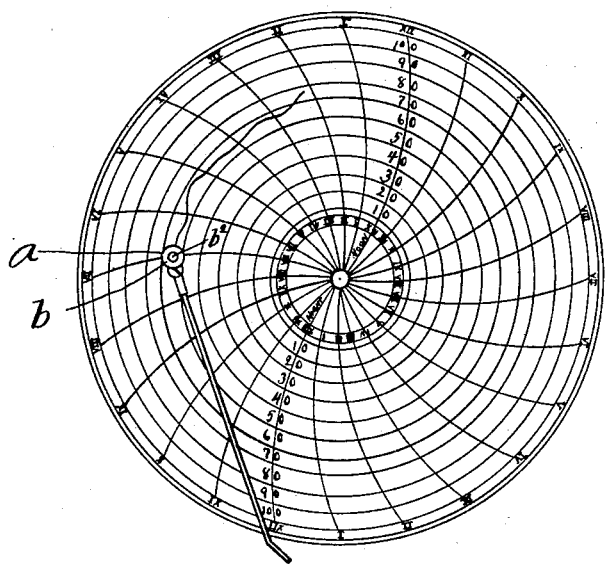

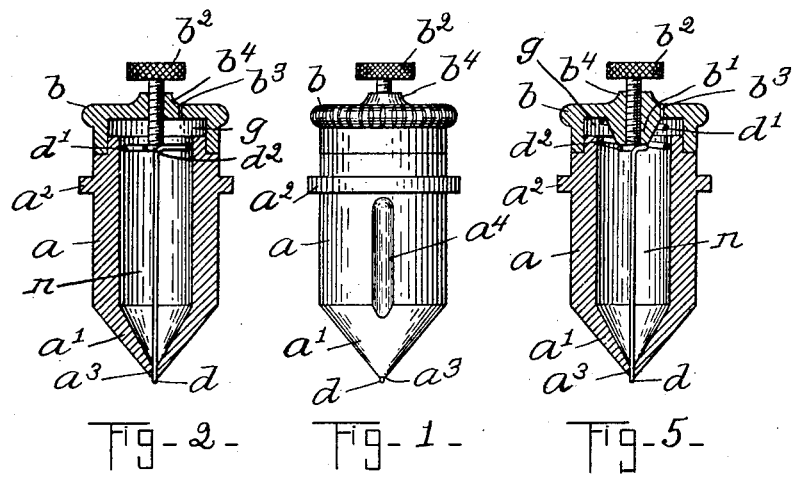
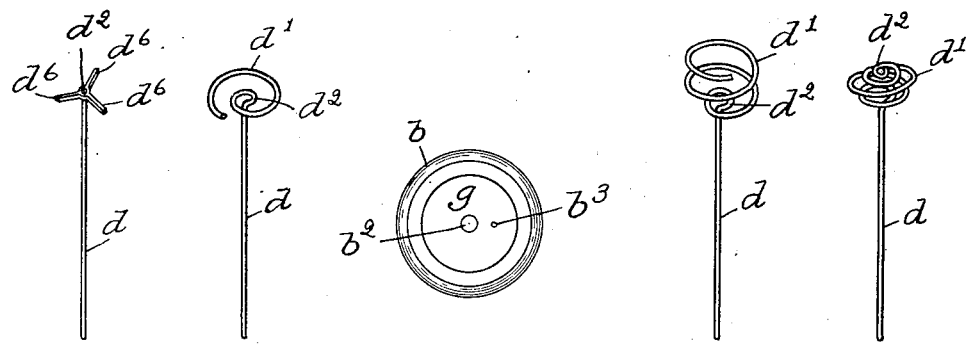

No. 739,319. PATENTED SEPT. 22, 1903.
F. A. JONES.
PEN FOR RECORDING INSTRUMENTS.
APPLICATION FILED JAN. 31, 1902.
NO MODEL. 2 SHEETS—SHEET 2.

Witnesses:
H. B. Davis
M. M. Piper.

Inventor:
Florentine A. Jones

No. 739,319. Patented September 22, 1903.

UNITED STATES PATENT OFFICE.

FLORENTINE A. JONES, OF BOSTON, MASSACHUSETTS.

PEN FOR RECORDING INSTRUMENTS.

SPECIFICATION forming part of Letters Patent No. 739,319, dated September 22, 1903.

Application filed January 31, 1902. Serial No. 91,976. (No model.)

*To all whom it may concern:*

Be it known that I, FLORENTINE A. JONES, of Boston, in the county of Suffolk and State of Massachusetts, have invented a new and useful Improvement in Pens for Recording Instruments, of which the following, taken in connection with the accompanying drawings, is a specification.

This invention has relation to that class of pens or marking devices that are employed in connection with gages, thermometers, or other instruments for recording pressures, temperatures, and their variations. One form of such pen is shown in my patent numbered 581,121, dated April 20, 1897. Pens of this class are of a necessity very small, and it is a difficult matter to conduct the ink from the interior of the pen to the chart or recording-dial in a regular and even manner, owing to the very small quantity required, so as to produce a clear line of uniform size on the chart, inasmuch as the movement of the chart and pen is usually extremely slow, and under these conditions to be able to cause a tracing of heavy or light proportions, as desired, yet of uniform size throughout its entire length, requires the utmost stability of conditions and nicety of adjustment. The wire or stylus must of necessity be of small diameter and the aperture through the point of the body of the pen of but slightly larger dimensions than the wire or stylus. Therefore the length of that portion of the stylus which projects beyond the point of the pen and outside of the same must remain practically fixed and unchangeable in operation. By the foregoing it will be readily understood that of necessity the wire or stylus must be maintained practically near the center of the reservoir of the pen to insure the necessary working conditions, and it must be maintained in a position to be adjusted by means provided for adjusting it.

In order to insure the continuous and proper working of the pen in the control of unskilled hands, it is best that the wire be so constructed as to obviate the necessity of its removal from the pen in filling the same with ink and at the same time prevent its being an obstacle to the ready flow of the ink into the reservoir of the pen in the act of filling. Therefore I have devised means to effectually accomplish these desirable objects, as will be hereinafter fully set forth, by so forming the wire or stylus as to hold it practically in the center of the reservoir of the pen, and also permit it to drop to the point of the reservoir where it does not obstruct the flow of the ink into the reservoir when the pen is removed from its holder and in the proper position for filling, the stylus being prevented by its formation from dropping out of the pen entirely, whereby it is prevented from being bent or otherwise put out of adjustment or working condition, as would often occur were the stylus to be removed out of the pen in the act of filling. It is also of the utmost importance to provide the most effective means to prevent any overflow of ink when replacing the cap after filling the pen.

To these ends the invention consists of a pen possessing certain features of novelty, all as illustrated upon the drawings and now to be described in detail, and pointed out in the claims.

Reference is to be had to the accompanying drawings, and to the letters marked thereon, forming a part of this specification, the same letters designating the same parts of features, as the case may be, wherever they occur.

Figure 9:
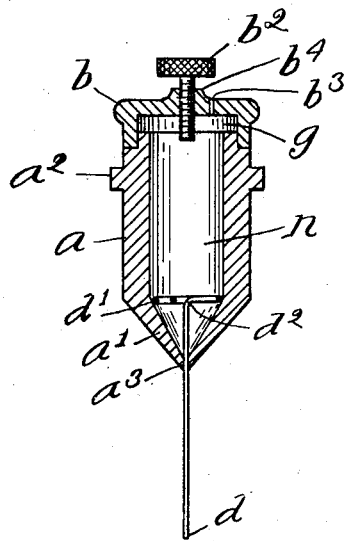

Of the drawings, Figure 1 is an elevation of a pen proper embodying my invention, the said figure being drawn on a large scale, so as to magnify the pen. Fig. 2 is a vertical longitudinal section of Fig. 1. Fig. 3 is a perspective view of the stylus used in Figs. 1 and 2. Fig. 4 shows the under side of the cap of the pen illustrated in Figs. 1 and 2. Fig. 5 is a view somewhat similar to Fig. 2, and Fig. 6 is a perspective view of the stylus employed therein. Figs. 7 and 8 are perspective views of other forms of ink-regulating wire or stylus that may be employed. Fig. 9 is a vertical longitudinal section of Fig. 1, showing the position of the stylus or ink-regulating wire $d\ d'$ when the pen is being filled with ink. Fig. 10 is a plan view of a chart with the pen in working position.

In carrying out my invention I employ a pen-body $a$, cylindrical in shape, with a pointed lower end $a'$ and with a flange $a^2$ and groove $a^4$ to assist in securing it in the end of the recording-arm of a gage or thermometer. The upper end of the body of the pen is reduced to form a shoulder for the cap $b$, which is provided with the central outwardly-projecting boss $b^4$, through which the adjusting-screw $b^2$ passes. The interior of the body of the pen forms a reservoir $n$, terminating in a delivering-orifice $a^3$, through which the lower end of the stylus or ink-regulating wire $d$ loosely projects, as shown in Figs. 1 and 2.

A vent $b^3$, opening into the chamber $g$ in the cap, is provided to permit a sufficient flow of the ink through the orifice $a^3$. It will be observed that the stylus $d$ projects loosely beyond the outer end of the ink-orifice $a^3$ and is never permitted to recede within the orifice $a^3$. It is not moved in or out to open or close the orifice, but is cylindrical in shape and is adjusted longitudinally for the purpose of regulating the distance which the end thereof projects beyond the ink-orifice. If the end of the stylus projects too far beyond the orifice, the ink will dry thereon before reaching the chart, and if it does not project far enough the ink may flow too freely and the chart be blotted. Hence an accurate and fixed adjustment of the stylus is essential in order to obtain the precise flow of ink necessary to insure the desired width of the record-line.

For the purpose of providing the adjustment of the stylus the screw $b^2$ in the cap $b$ is arranged to press against it at $d^2$, so that by turning the screw in one direction or the other the stylus is easily moved out or permitted to recede. The screw $b^2$ serves as an adjustable stop for the inner end of the stylus.

In Figs. 2 and 3 the stylus is shown as being provided at its upper or inner end with means for centering it in the pen, said means consisting of a circle or coil $d'$, formed of the wire $d$ and lying in a transverse plane through the pen and while engaging the wall thereof is freely movable therein, said means forming a bearing portion or support for the inner end of the stylus.

The screw $b^2$ bears against the wire at the bend $d^2$, and the wire extends from thence in a straight line through the orifice. The stylus is thus entirely free from the cap of the pen, which may be removed without disturbing or removing the stylus from the pen.

For the purpose of filling the reservoir of the pen the cap $b$ is removed and the stylus is allowed to drop through the ink-orifice until the coil $d'$ rests at the terminus of the cylindrical part of the reservoir of the pen, after which the ink may be placed in the reservoir or well by a dropper or by the employment of any other means.

By reference to Figs. 2 and 4 it will be seen that the cap $b$ is provided with an air-chamber $g$, which forms a recess in the under side of the cap $b$ above the body of the pen and is fully open into the well of the pen, which contains the ink, and the vent-hole $b^3$ is formed in the end of the cap $b$ and opens into the air-chamber $g$.

It is evident that the stylus may be constructed in a variety of ways. For instance, in Fig. 6 I have shown the upper end thereof as being constructed in the form of a helix $d'$, the coils of which engage the interior walls of the pen-body and center it therein, as shown in Fig. 5, the stylus being shown in this illustration in the form which it assumes when the pen is in working position, wherein it will be seen that the end of the screw $b^2$ or the cap bears against the ink-regulating wire or stylus at the point $d^2$ for the purpose of preventing the stylus from receding.

In Fig. 7 the stylus is constructed at its upper end with a spiral $d'$, one coil of which engages the interior walls of the pen-body and serves to center it, while the remaining coil is brought into a coil of a size that would make contact with the end of the screw $b^2$. In this case the end of the screw $b^2$ bears against the end of the spiral, as at $d^2$, and as the coils are not extended the spiral does not yield, and hence the wire or stylus may be adjusted by the screw and is held practically rigid.

In Fig. 8 the centering device for the stylus consists of a cross-bar having three arms $d^6$ $d^6$ $d^6$, or a single bar would suffice. When the stylus is constructed in this way, the bar is formed separate and secured to the wire or stylus. I have contemplated constructing the stylus in other different ways, but shall not attempt to illustrate nor describe all of them, as those illustrated upon the drawings and hereinbefore described are sufficient to enable one skilled in the art to construct and employ a pen containing my invention.

By constructing a pen in accordance with the foregoing description it will be seen that the wire or stylus is not attached to any portion of the pen, and therefore it is not necessary to remove it to fill the pen, the filling being easily done by removing the cap and allowing the stylus to drop to the point of the pen, from whence it readily returns itself to place when the cap is replaced and the pen in working position. It centers itself by reason of the contact of the coils with the walls of the pen, so that a regular flow of ink is permitted, and, moreover, it maintains itself in a position to be adjusted by a screw in the cap, all of which are features of great importance in this class of pens. The screw in the cap is essential to an accurate and ready adjustment of the stylus in changing the distance it projects through or beyond the point of the pen, and changing the flow of ink without replacing the stylus by another one; but in so far as regards the proper working of the pen the stylus may remain in constant contact with the cap of the pen in such manner as to prevent the stylus from receding within the orifice $a^3$ and obtain a tracing of uniform width. By forming a chamber for air above the body part of the pen and placing the vent-hole in the end of the cap and away from the edge of the cap $b$ any overflow of the ink in replacing the cap after filling the pen is prevented, which is of great practical importance.

Having thus explained the nature of the invention and described a way of constructing and using the same, though without attempting to set forth all of the forms in which it may be made or all of the modes of its use, I declare that what I claim is—

1. A pen having a cap and an adjusting-screw therethrough, and provided with a stylus formed into a coil, with which said adjusting-screw engages, said stylus extending through the ink-orifice, and sliding freely within the reservoir of the pen.

2. A pen having a cap and an adjusting-screw, and provided with a stylus unattached to any part of the pen, with which said adjusting-screw engages, said stylus extending through the ink-orifice, and movable within the reservoir of the pen.

3. A pen having a reservoir closed by a cap with an adjusting-screw therethrough, and a stylus unattached to any part of the pen adapted to be adjusted by the screw in the cap, and extending through the ink-orifice.

4. A pen provided with a reservoir closed by a cap having an adjusting-screw therethrough, and having a stylus formed of a wire extending through the ink-orifice with its upper end formed into spiral coils, one of which engages with the said adjusting-screw.

5. A pen having a reservoir closed by a cap, and a rigid stylus, unattached to any part of the pen, freely movable within the reservoir and extending through the ink-orifice and a stop by contact with which said stylus is unrecedingly fixed.

6. A pen having a reservoir closed by a cap, and a stylus formed into a circle on its upper end freely movable within the reservoir and extending through the ink-orifice and a stop by contact with which said stylus is unrecedingly fixed.

7. A pen having a reservoir closed by a cap, and provided with a stylus consisting of a wire extending through the ink-orifice having a series of spiral coils on its upper end and a stop by contact with which said stylus is unrecedingly fixed.

8. A pen having a reservoir closed by a cap, a rigid stylus, unattached to any part of the pen, freely movable within the reservoir, one end of which extends through the ink-orifice and an adjustable stop against which the opposite end of said stylus bears.

9. A pen having a reservoir closed by a cap, a rigid stylus, unattached to any part of the pen, freely movable within the reservoir, the outer end of which extends through the ink-orifice and a stop against which the inner end bears, and a bearing portion or support on the inner end of said stylus, which engages the wall of the reservoir, and holds the stylus centrally disposed within the reservoir.

10. A pen having a reservoir, a cap, which closes it, a rigid stylus, unattached to any part of the pen, freely movable in said reservoir, the body portion of which projects through the ink-orifice when filling said reservoir with ink.

11. A pen having a reservoir, a cap, which closes it, a rigid stylus unattached to any part of the pen, freely movable therein and having at its inner end an enlarged portion, the body portion of said stylus projecting through the ink-orifice when filling said reservoir with ink.

In testimony whereof I have signed my name to this specification, in the presence of two subscribing witnesses, on this 29th day of January, A. D. 1902.

FLORENTINE A. JONES.

Witnesses:
FRANK G. PARKER,
JOHN BUCKLER.